US011194212B2

(12) United States Patent
Lee et al.

(10) Patent No.: US 11,194,212 B2
(45) Date of Patent: Dec. 7, 2021

(54) ELECTROCHROMIC DEVICE

(71) Applicant: LG CHEM, LTD., Seoul (KR)

(72) Inventors: Dong Hyun Lee, Daejeon (KR); Chang Yoon Lim, Daejeon (KR); Su Hee Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 160 days.

(21) Appl. No.: 16/577,419

(22) Filed: Sep. 20, 2019

(65) Prior Publication Data

US 2020/0041858 A1    Feb. 6, 2020

Related U.S. Application Data

(63) Continuation of application No. PCT/KR2018/002747, filed on Mar. 8, 2018.

(30) Foreign Application Priority Data

Mar. 21, 2017  (KR) .......................... 10-2017-0035157

(51) Int. Cl.
G02F 1/155 (2006.01)
G02F 1/1343 (2006.01)

(52) U.S. Cl.
CPC .......... *G02F 1/155* (2013.01); *G02F 1/13439* (2013.01)

(58) Field of Classification Search
CPC ............ G02F 2001/1552; G02F 1/155; G02F 1/136272
USPC .......................................................... 359/267
See application file for complete search history.

(56) References Cited

U.S. PATENT DOCUMENTS

2012/0170100 A1*  7/2012  Yang ...................... G02F 1/155
                                                               359/271
2015/0077361 A1    3/2015  Seo et al.

FOREIGN PATENT DOCUMENTS

| CN | 205643982 U | 10/2016 |
|----|-------------|---------|
| JP | 56-91274 A | 7/1981 |
| JP | 61-167926 A | 7/1986 |
| JP | 1-142927 U | 9/1989 |
| JP | 10-239716 A | 9/1998 |
| KR | 10-2008-0051280 A | 6/2008 |
| KR | 10-2014-0039377 A | 4/2014 |
| KR | 10-1447596 B1 | 10/2014 |
| KR | 10-2015-0031917 A | 3/2015 |
| KR | 10-2015-0087012 A | 7/2015 |
| KR | 10-2015-0090460 A | 8/2015 |
| KR | 10-1657965 B1 | 9/2016 |
| KR | 10-2017-0025937 A | 3/2017 |

(Continued)

OTHER PUBLICATIONS

International Search Report for PCT/KR2018/002747 (PCT/ISA/210) dated Jun. 14, 2018, with English translation.

(Continued)

*Primary Examiner* — Lucy P Chien
(74) *Attorney, Agent, or Firm* — Birch, Stewart, Kolasch & Birch, LLP

(57) ABSTRACT

An electrochromic device is provided. The electrochromic device may include a plurality of auxiliary electrodes spaced apart from each other in both a first direction and a second direction. The electrochromic device may improve an electrochromism rate and prevent a drive failure problem due to oxidation of the auxiliary electrode from spreading.

13 Claims, 22 Drawing Sheets

(56) References Cited

FOREIGN PATENT DOCUMENTS

WO    WO 2016/126460 A2    8/2016
WO    WO 2016/203700 A1    12/2016

OTHER PUBLICATIONS

Supplementasy European Search Report for EP 18 77 2166 dated Jan. 21, 2020.

* cited by examiner

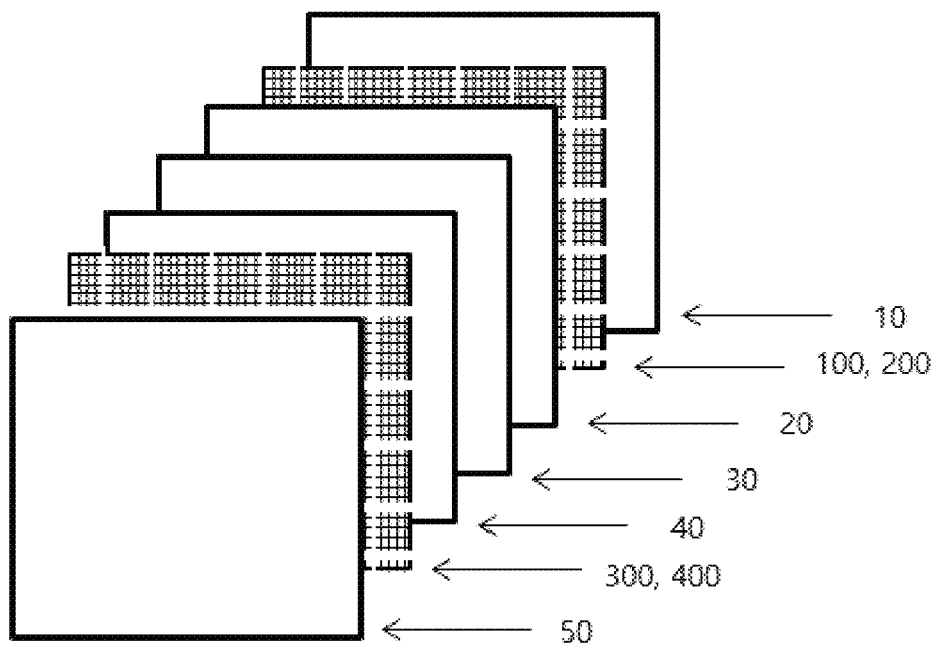
Fig. 28
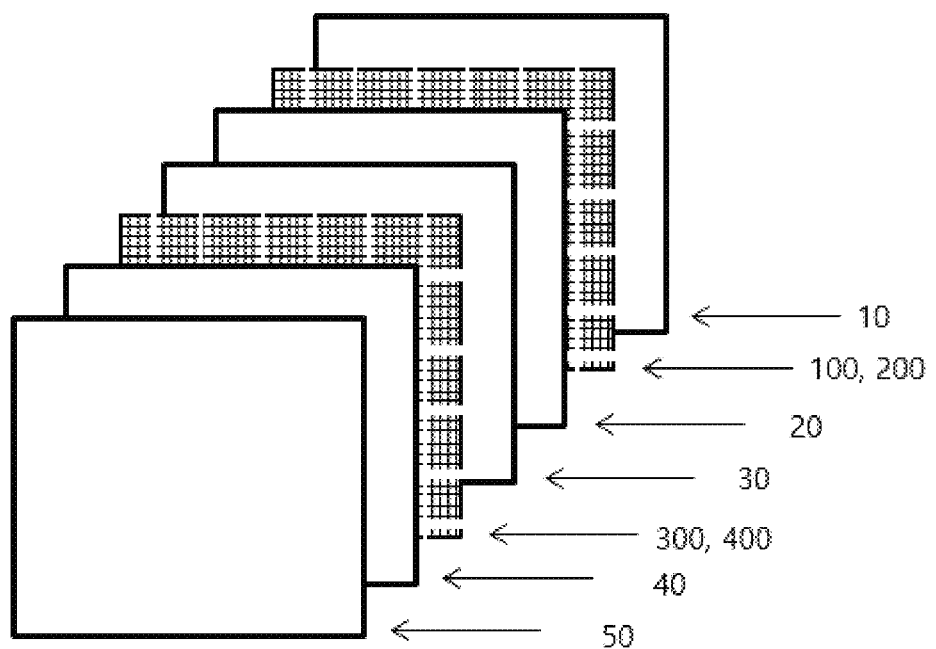
Fig. 29 (First 26)

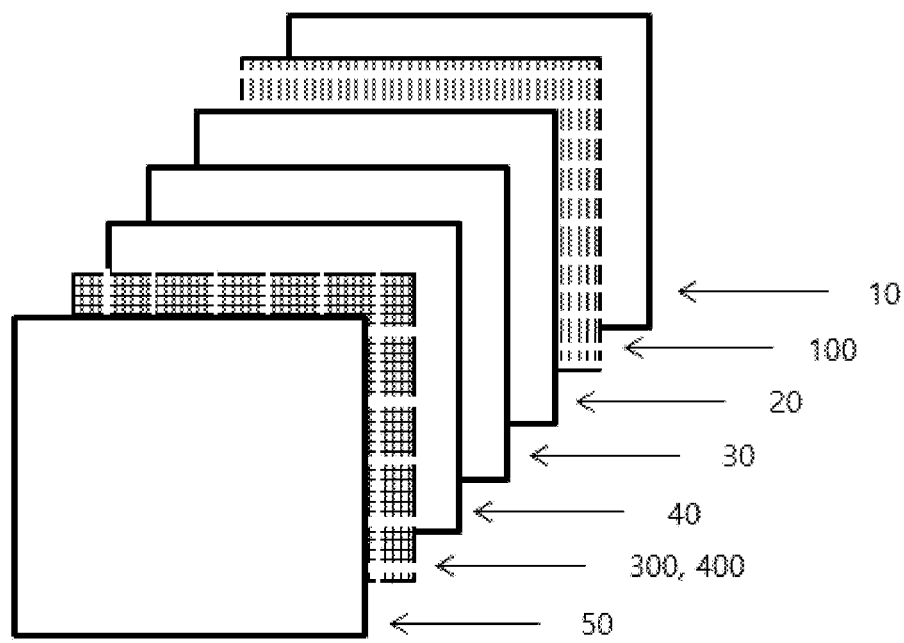
Fig. 30 (Second 26)
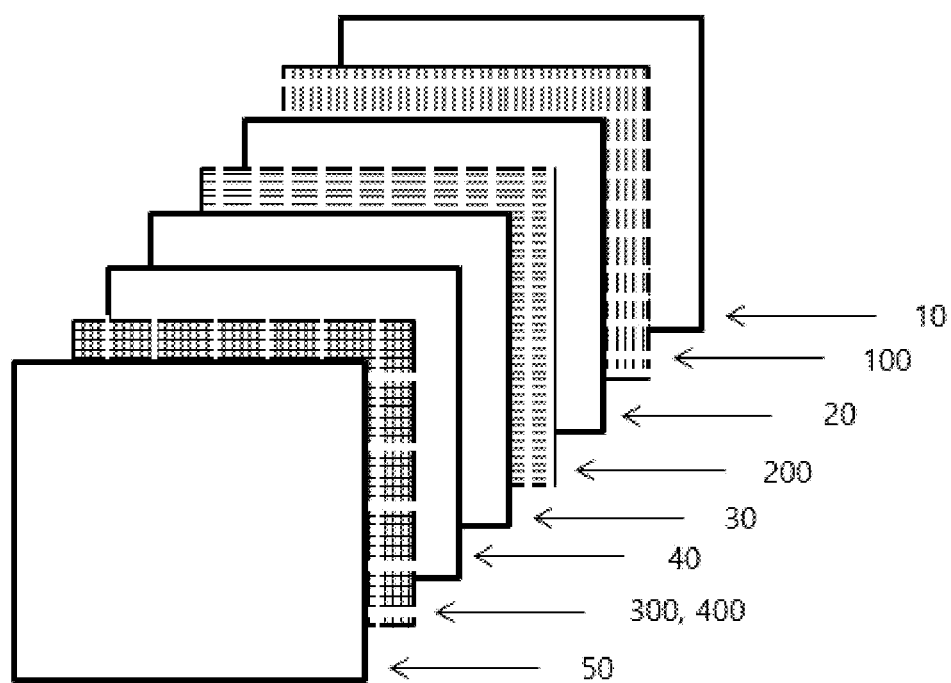
Fig. 31

ELECTROCHROMIC DEVICE

CROSS-REFERENCE TO RELATED APPLICATIONS

This application is a Continuation of PCT International Application No. PCT/KR2018/002747, filed on Mar. 8, 2018, which claims priority to Korean Patent Application No. 10-2017-0035157 filed on Mar. 21, 2017, all of which are hereby expressly incorporated by reference into the present application.

TECHNICAL FIELD

The present application relates to an electrochromic device.

BACKGROUND ART

The electrochromism refers to a phenomenon in which an optical property of an electrochromic material is changed by an electrochemical oxidation or reduction reaction, where the device using the phenomenon is called an electrochromic device. Specifically, the electrochromic device changes its optical property in such a manner that when a potential is applied to the device, electrolyte ions are inserted into or removed from the electrochromic material, and at the same time, electrons move through an external circuit. Such an electrochromic device is capable of producing large area devices with a small cost and has low power consumption, thereby attracting attention as smart windows or smart mirrors, and other next-generation architectural window materials. However, since it takes a long time for insertion reaction and/or elimination reaction of the electrolyte ions to change the optical characteristics, there is a disadvantage that a color-switching speed is slow. Such a problem is conspicuous when the electrochromic device is large-sized.

With regard to improvement of the color-switching speed, attempts have been made to vary electrode materials and electrode shapes. For example, since the high surface resistance of a transparent conductive electrode represented by ITO has been pointed out as a main cause of color-switching speed decrease and color-switching non-uniformity, attempts have been made to replace conventional electrodes such as ITO with low-resistance transparent electrodes such as a metal mesh or an OMO (oxide/metal/oxide). However, only the introduction of the low-resistance electrode has a limitation in improving the color-switching speed, and above all, there is a problem that the unit price of the device is rapidly increased.

DISCLOSURE

Technical Problem

It is one object of the present application to provide an electrochromic device having improved color-switching speed or electrochromic switching speed.

It is another object of the present application to provide an electrochromic device capable of improving a durability deterioration problem of the device due to oxidation of an auxiliary electrode.

The above objects and other objects of the present application can be all solved by the present application which is described in detail below.

Technical Solution

To solve the above objects, according to one example of the present application, there may be provided an electrochromic device comprising a stack of a first electrode layer, an electrochromic layer, an electrolyte layer, and a second electrode layer.

In one embodiment of the present application, the electrochromic device may comprise an auxiliary electrode.

In another embodiment of the present application, the auxiliary electrode comprises a plurality of first auxiliary electrodes in the stack and arranged side by side in a first direction, where the plurality of first auxiliary electrodes may be spaced from each other in the first direction and a second direction.

In another embodiment of the present application, the electrochromic device further comprises a plurality of second auxiliary electrodes in the stack and arranged side by side in the second direction, where the plurality of second auxiliary electrodes may be spaced from each other in the first direction and the second direction.

In another embodiment of the present application, the electrochromic device may comprise the first auxiliary electrodes or the second auxiliary electrodes on a first side of the electrochromic layer.

In another embodiment of the present application, the electrochromic device may comprise both the first auxiliary electrodes and the second auxiliary electrodes on the first side of the electrochromic layer and facing a first side of the electrolyte layer.

In another embodiment of the present application, at least one first auxiliary electrode of the first auxiliary electrodes and at least one second auxiliary electrode of the second auxiliary electrodes may have at least one intersection.

In another embodiment of the present application, the electrochromic device may further comprise an ion storage layer between the electrolyte layer and the second electrode layer.

In another embodiment of the present application, the electrochromic device may further comprise a plurality of third auxiliary electrodes arranged side by side in the first direction on a first side of the ion storage layer. The plurality of third auxiliary electrodes may be spaced from each other in the first direction and the second direction.

In another embodiment of the present application, the electrochromic device may further comprise a plurality of fourth auxiliary electrodes arranged side by side in the second direction on the first side of the ion storage layer or a second side of the ion storage layer. The plurality of fourth auxiliary electrodes may be spaced from each other in the first direction and the second direction.

In another embodiment of the present application, the electrochromic device may comprise the third auxiliary electrodes and the fourth auxiliary electrodes on the first side of the ion storage layer and face the first side of the electrolyte layer.

In another embodiment of the present application, at least one third auxiliary electrode of the third auxiliary electrodes and at least one fourth auxiliary electrode of the fourth auxiliary electrodes may have at least one intersection.

In another embodiment of the present application, the first to fourth auxiliary electrodes may comprise conductive lines and insulating parts surrounding the conductive lines.

In another embodiment of the present application, the conductive line may comprise a metal selected from at least one of silver (Ag), copper (Cu), aluminum (Al), magnesium (Mg), gold (Au), platinum (Pt), tungsten (W), molybdenum (Mo), titanium (Ti), nickel (Ni), and an alloy thereof; graphene; or carbon nanotubes.

In another embodiment of the present application, the insulating part may comprise an insulating material having an electric conductivity of $10^{-6}$ S/m or less.

In another embodiment of the present application, the insulating material may comprise a (meth)acrylate resin or an epoxy resin.

In another embodiment of the present application, the first electrode layer and the second electrode layer may comprise a transparent conductive compound, a metal mesh, or an OMO (oxide/metal/oxide).

In another embodiment of the present application, the ion storage layer and the electrochromic layer may comprise an electrochromic material having color-development (reaction) characteristics different from each other.

Hereinafter, the electrochromic device according to one embodiment of the present application will be described in detail with reference to the accompanying drawings.

Advantageous Effects

The electrochromic device according to one example of the present application provides the effect of the invention that the color-switching speed can be improved without increasing the manufacturing cost. In addition, the present application can provide an electrochromic device capable of preventing or improving the durability deterioration problem due to oxidation of the exposed conductive line upon introducing the auxiliary electrode.

BRIEF DESCRIPTION OF DRAWINGS

FIGS. 4-37 schematically illustrate arrangements of the layers of an electrochromic device according to embodiments of the present invention.

BEST MODE

Figure 1:
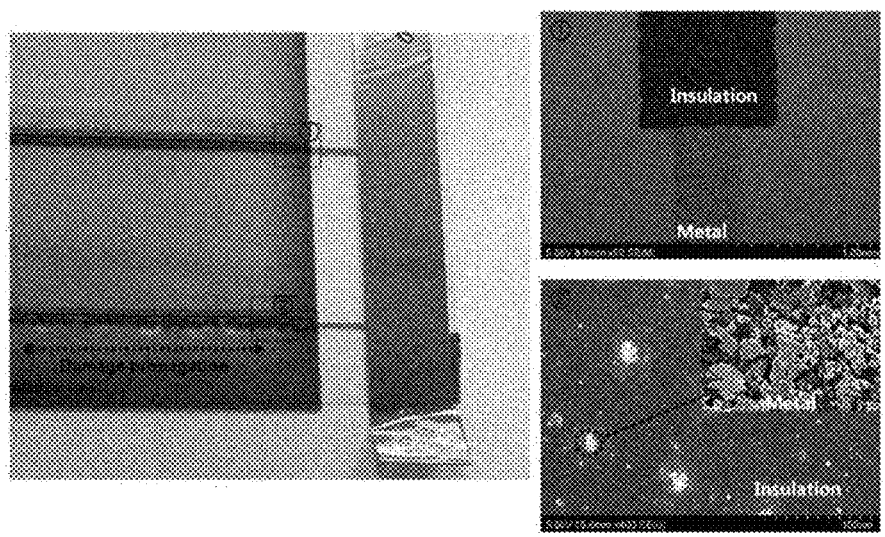
FIG. 1 is an image photographing an expanded appearance of damage of an auxiliary electrode when a part of conductive line of the electrode is oxidized while being exposed.

In one example of the present application, the present application relates to an electrochromic device. The electrochromic device of the present application may comprise a first electrode layer, an electrochromic layer, an electrolyte layer, and a second electrode layer sequentially. That is, the electrochromic device of the present application may comprise a first electrode layer, an electrochromic layer provided on the first electrode layer, an electrolyte layer provided on the electrochromic layer, and a second electrode layer provided on the electrolyte layer. In the present application, the term "~ on" used in relation to positions between constitutions is used as a meaning corresponding to 'above' or 'upper part,' and unless specifically stated otherwise, it may also mean that the constitution with the relevant position directly contacts another constitution and simultaneously is on top of that, and it may also mean that other constitutions are present between them.

The kind of the first and second electrode layers is not particularly limited. For example, as long as it is an electrode material having a transmittance to visible light of 60% or more, it is not particularly limited, which may be used as the electrode layer. In the present application, the term "visible light" may mean light in a wavelength range of 380 nm to 780 nm, more specifically, light having a wavelength of 550 nm.

In one example, the electrode layer may comprise a transparent conductive oxide. As an example of the transparent conductive oxide, ITO (indium tin oxide), $In_2O_3$ (indium oxide), IGO (indium gallium oxide), FTO (fluor doped tin oxide), AZO (aluminum doped zinc oxide), GZO (gallium doped zinc oxide), ATO (antimony doped tin Oxide), IZO (indium doped zinc oxide), NTO (niobium doped titanium oxide), ZnO (zinc oxide) or CTO (cesium tungsten oxide), and the like can be used.

In another example, the electrode layer may comprise an OMO (oxide metal oxide). The OMO may comprise a first metal oxide layer and a second metal oxide layer, and a metal layer, including a low-resistance material as silver (Ag), between the two metal oxide layers. The first or second metal oxide layer may comprise one or more metal oxide selected from the group consisting of Sb, Ba, Ga, Ge, Hf, In, La, Ma, Se, Si, Ta, Se, Ti, V, Y, Zn and Zr. Also, the metal layer may comprise a low-resistance material such as copper (Cu), aluminum (Al), magnesium (Mg), gold (Au), platinum (Pt), tungsten (W), molybdenum (Mo), titanium (Ti) and nickel (Ni) in addition to silver (Ag).

In another example, the first and second electrode layers may be an electrode in the form of a metal mesh. More specifically, the electrode layer may be a metal mesh in which electrode lines comprising silver (Ag), copper (Cu), aluminum (Al), magnesium (Mg), gold (Au), platinum (Pt), tungsten (W), molybdenum (Mo), titanium (Ti) or nickel (Ni) form a lattice shape.

The electrochromic layer may be a layer comprising a material capable of color-switching by an electrochemical reaction induced by a voltage to be applied, that is, an electrochromic material. As the electrochromic material, for example, an organic or an inorganic electrochromic material may be used. As the organic electrochromic material, a material such as viologen, anthraquinone and phenothiazine as well as a polymer such as polypyrrole, polyaniline, polypyridine, polyindole and polycarbazole may be used.

In one example, an inorganic electrochromic material may be used as the electrochromic material. More specifically, an oxidative inorganic electrochromic material which changes color by an oxidation reaction or a reductive inorganic electrochromic material which changes color by a reducing reaction may be used. As an unlimited example of the oxidative electrochromic material, one or more oxides of metals selected from Cr, Mn, Fe, Co, Ni, Rh, and Ir, such as LiNiOx, $IrO_2$, NiO, $V_2O_5$, $LixCoO_2$, $Rh_2O_3$, or prussian blue may be used. As an unlimited example of the reductive electrochromic material, one or more oxides of metals selected from Ti, Nb, Mo, Ta or W, such as $WO_3$, $MoO_3$, $Nb_2O_5$, $Ta_2O_5$ or $TiO_2$, may be used. A method for providing the electrochromic layer containing the inorganic electrochromic material is not particularly limited. For example, an electrochromic layer may be provided by applying a composition containing inorganic electrochromic particles on a base material through a wet coating method, or an electrochromic layer may be provided by using a deposition method using the inorganic component.

The electrolyte layer may provide electrolyte ions involved in the color-switching reaction. The electrolyte ion may be exemplified by $H^+$, $Li^+$, $Na^+$, $K^+$, $Rb^+$, or $Cs^+$. The type of the electrolyte used in the electrolyte layer is not particularly limited, and a liquid electrolyte, a gel polymer electrolyte, or an inorganic solid electrolyte may be used without limitation.

If the electrolyte may comprise a compound capable of providing $H^+$, $Li^+$, $Na^+$, $K^+$, $Rb^+$, or $Cs^+$ with the electrochromic layer or an ion storage layer to be described below, the specific composition of the electrolyte contained in the electrolyte layer is not particularly limited. For example, the electrolyte layer may comprise a lithium salt compound such as $LiClO_4$, $LiBF_4$, $LiAsF_6$, or $LiPF_6$, or a sodium salt compound such as $NaClO_4$.

In another example, the electrolyte may further comprise a carbonate compound as a solvent. Since the carbonate-based compound has a high dielectric constant, the ion conductivity can be increased. As an unlimited example, a solvent such as PC (propylene carbonate), EC (ethylene carbonate), DMC (dimethyl carbonate), DEC (diethyl carbonate) or EMC (ethylmethyl carbonate) may be used as the carbonate-based compound.

The electrochromic device of the present application may comprise an auxiliary electrode. The auxiliary electrode may comprise a conductive line and an insulating part surrounding the conductive line, as constitutions distinct from the first electrode layer and the second electrode layer. The auxiliary electrode comprising the conductive line can improve a reaction rate of the device. In addition, the insulating part may prevent penetration of electrolyte ions into the conductive line, thereby improving or preventing elution of the metal component forming the conductive line, the reaction rate deterioration thereof, and the durability deterioration problem of the device.

In one example, the conductive line may comprise a metallic component selected from silver (Ag), copper (Cu), aluminum (Al), magnesium (Mg), gold (Au), platinum (Pt), tungsten (W), molybdenum (Mo), titanium (Ti), nickel (Ni) and an alloy thereof. In another example, the conductive line may comprise graphene or carbon nanotubes.

The insulating part may comprise an insulating material having an electric conductivity of $10^{-6}$ S/m or less. The lower limit of the electric conductivity is not particularly limited, because the lower the electric conductivity, the characteristics of the insulating material can be improved. The method of measuring electric conductivity is not particularly limited, which can be measured by various known methods.

If the electric conductivity in the above range may be satisfied, the type of the usable insulating material is not particularly limited. For example, an acrylic resin or an epoxy resin may be used as the insulating material, and other organic and/or inorganic materials may be used as the insulating material.

The inventors of the present application have confirmed that although the insulating part of the auxiliary electrode protects the conductive line from external electrolyte ions, there is a limit. Particularly, they have confirmed that when a part of the conductive line surrounded by the insulating part is exposed to electrolyte ions, the conductive line is oxidized and the damage caused by the oxidation occurs continuously along the conductive line, whereby the damage is enlarged as in FIG. 1. When the damage is enlarged, the auxiliary electrode cannot perform its function. In consideration of this point, the inventors of the present application have designed the auxiliary electrode as follows, so that the oxidization of the conductive line occurring in part does not adversely affect the adjacent auxiliary electrodes.

Figure 2:
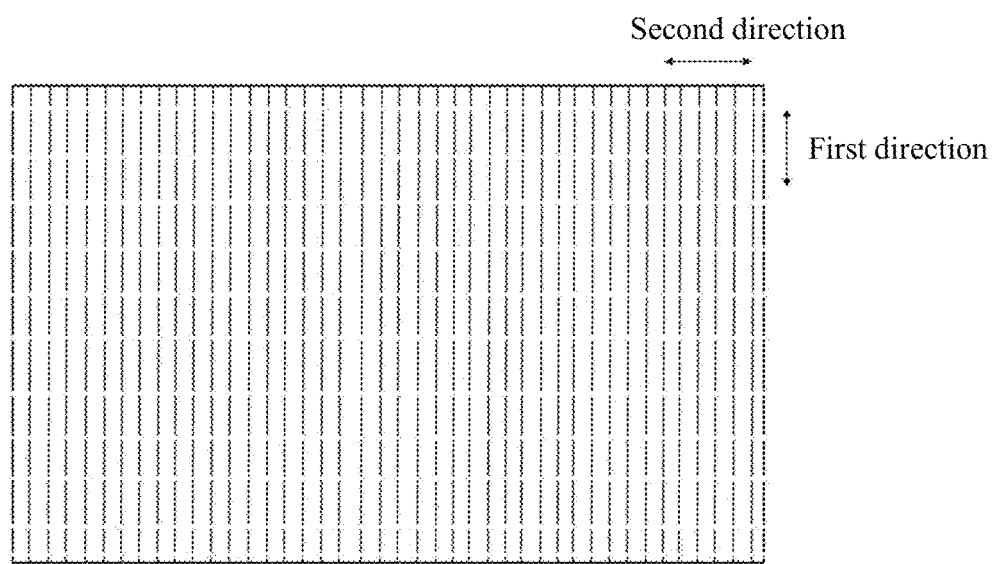
FIG. 2 schematically shows an appearance that auxiliary electrodes are arranged according to one embodiment of the present application.

In one example, the electrochromic device of the present application may comprise a plurality of auxiliary electrodes which are arranged in any one direction and are electrically short-circuited (disconnected) with one another. Specifically, as in FIG. 2, the device of the present application may comprise a plurality of first auxiliary electrodes arranged in a first direction, where the plurality of first auxiliary electrodes are spaced apart from each other in the first direction and a second direction. In the present application, the first auxiliary electrode may be used as a meaning collectively called a plurality of first auxiliary electrodes, and each individual first auxiliary electrode may be referred to as "subordinate first auxiliary electrode." The regions where the auxiliary electrodes function can be individually partitioned by the constitution as above, and as a result, even if the conductive line in the auxiliary electrode is oxidized while being exposed, it is possible to prevent an operation failure problem in the damaged region due to the oxidation from spreading to adjacent regions. In the present application, when a virtual straight line extending in each direction is assumed, the first direction and the second direction mean a relative direction in which the virtual straight lines can intersect without being parallel to each other. The angle at which the electrode line in the first direction intersects with the electrode line in the second direction is not particularly limited, which may be, for example, 90°.

In one example, the electrochromic device may further comprise a plurality of second auxiliary electrodes arranged side by side in the second direction. At this time, the plurality of second auxiliary electrodes may also be spaced apart from each other in the first direction and the second direction.

In one example, the electrochromic device may comprise the first auxiliary electrode or the second auxiliary electrode on one side of the electrochromic layer.

In another example, the electrochromic device may comprise both the first auxiliary electrode and the second auxiliary electrode on one side of the electrochromic layer facing one side of the electrolyte layer.

Figure 3:
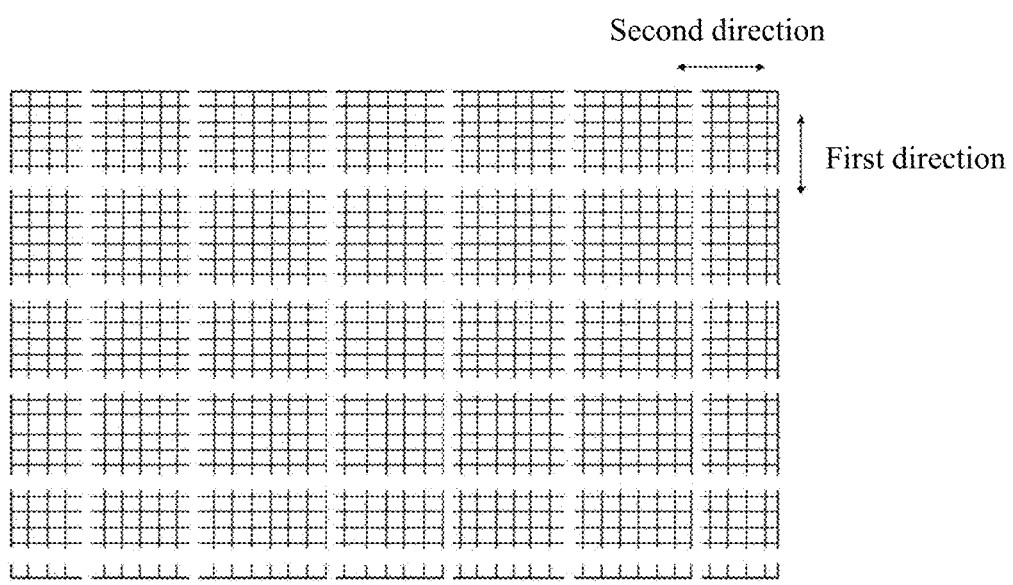
FIG. 3 schematically shows an appearance that auxiliary electrodes are arranged according to another embodiment of the present application.
Figure 4:
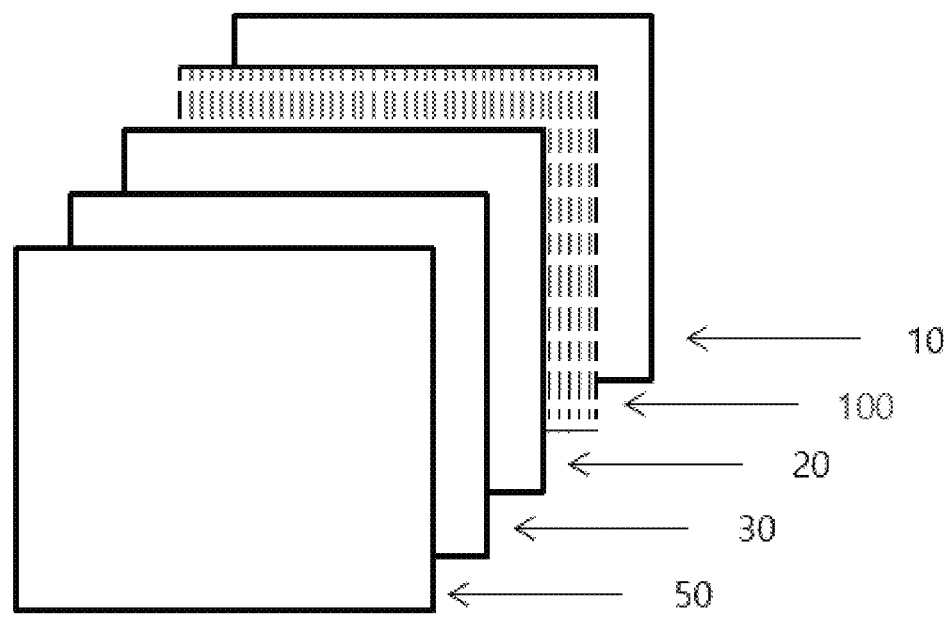
Figure 5:
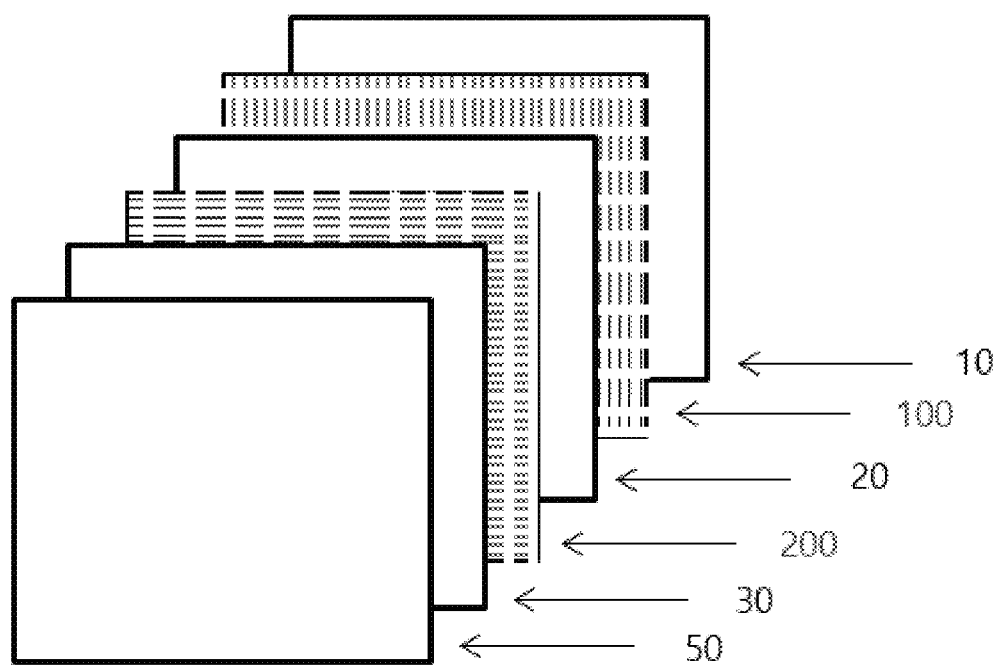
Figure 6:
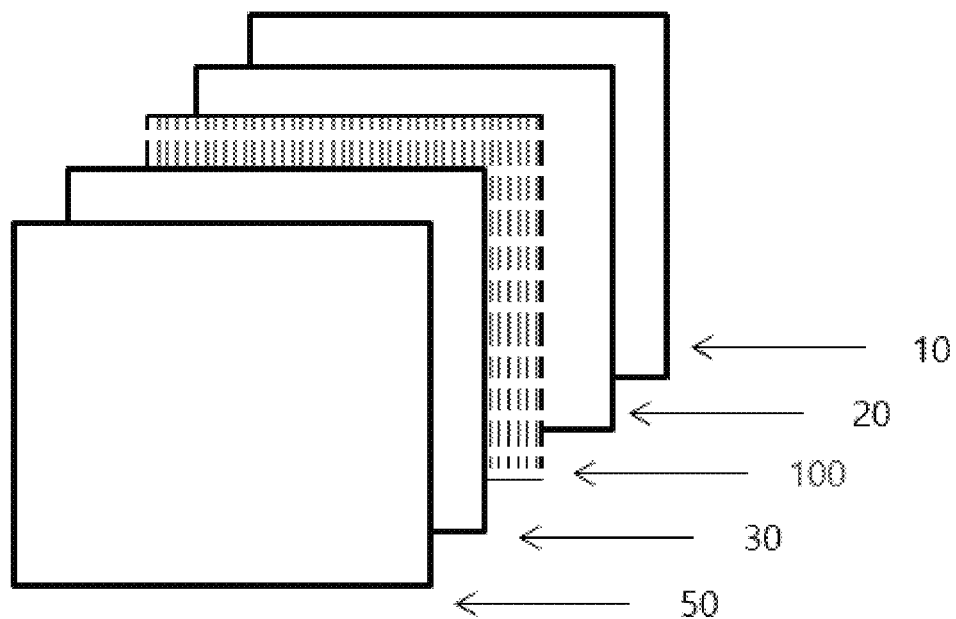
Figure 7:
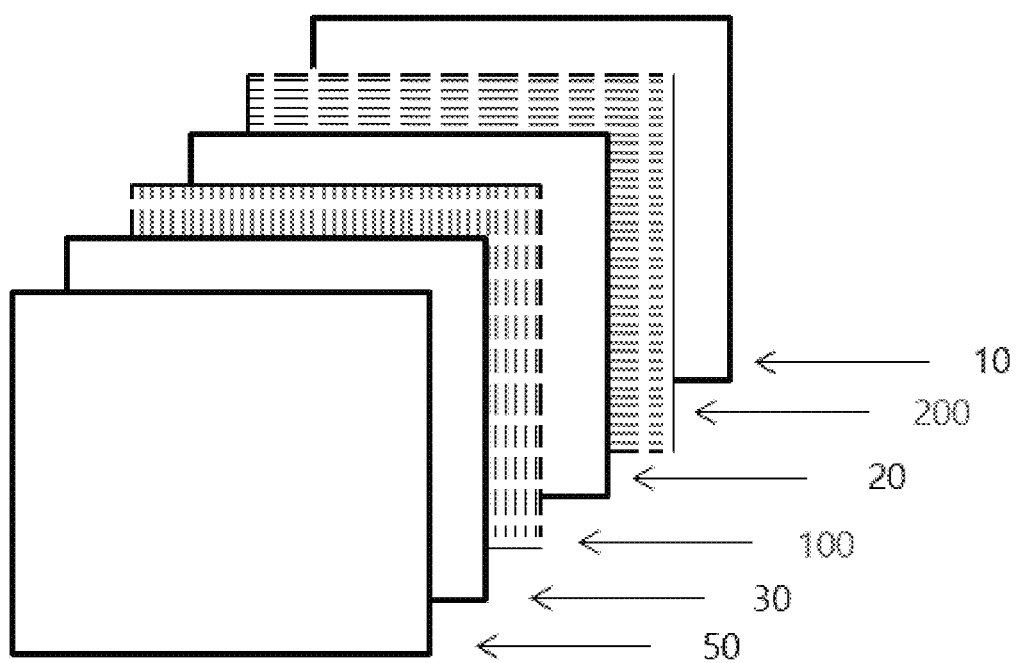
Figure 8:
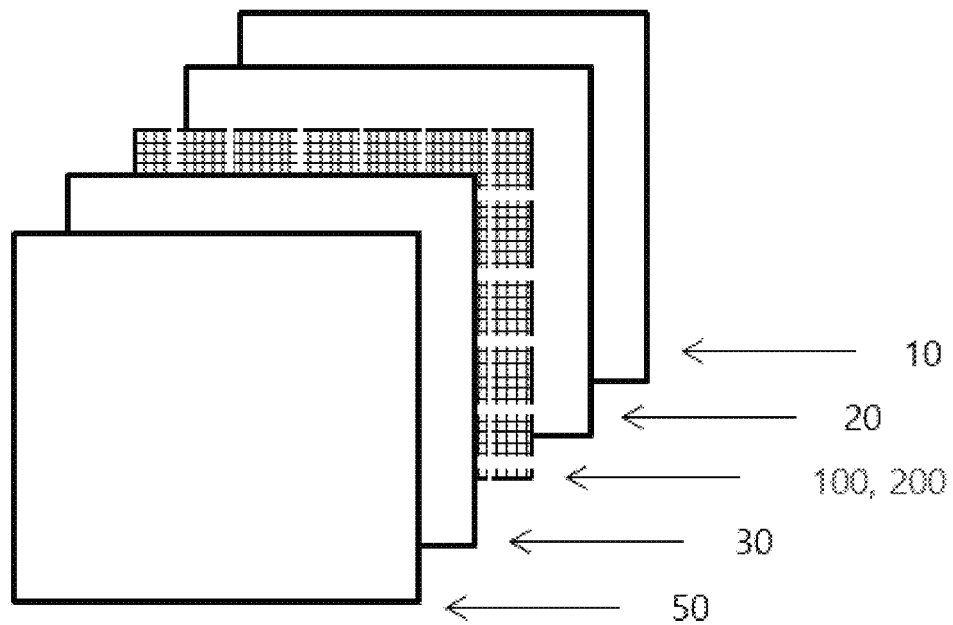
Figure 9:
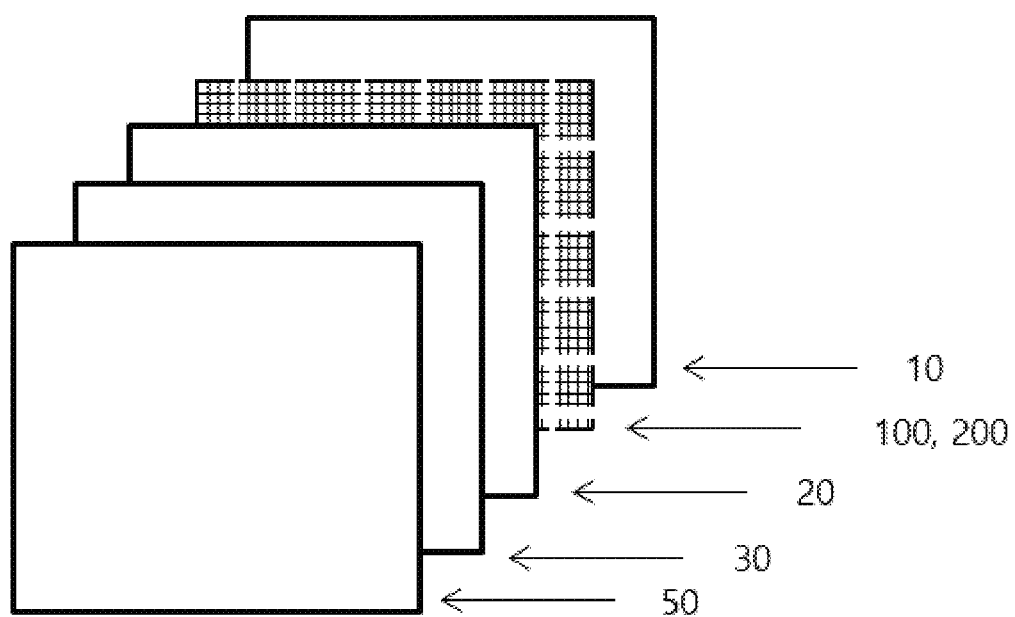
Figure 10:
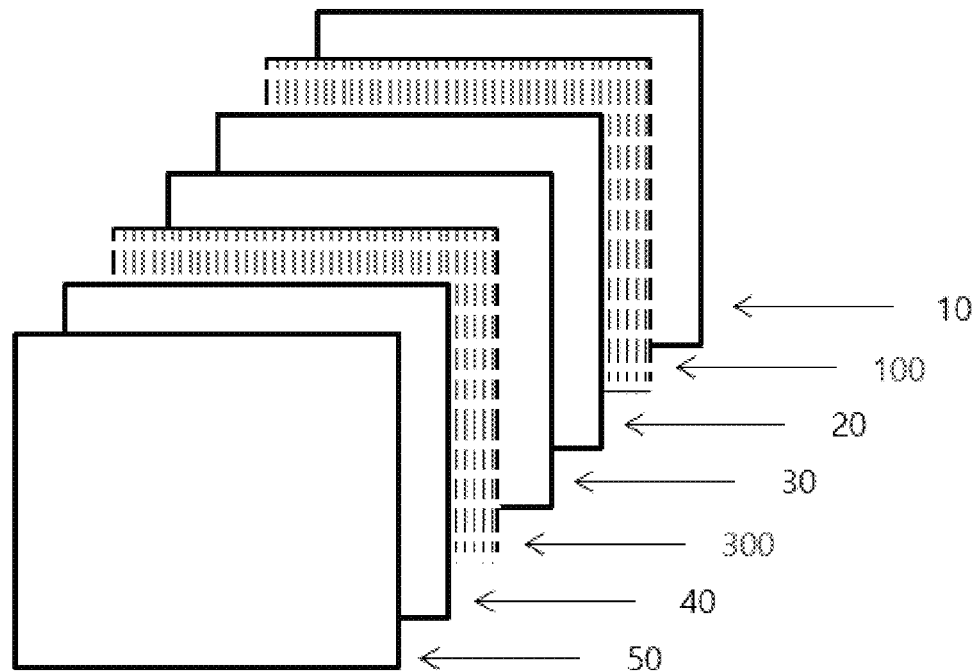
Figure 11:
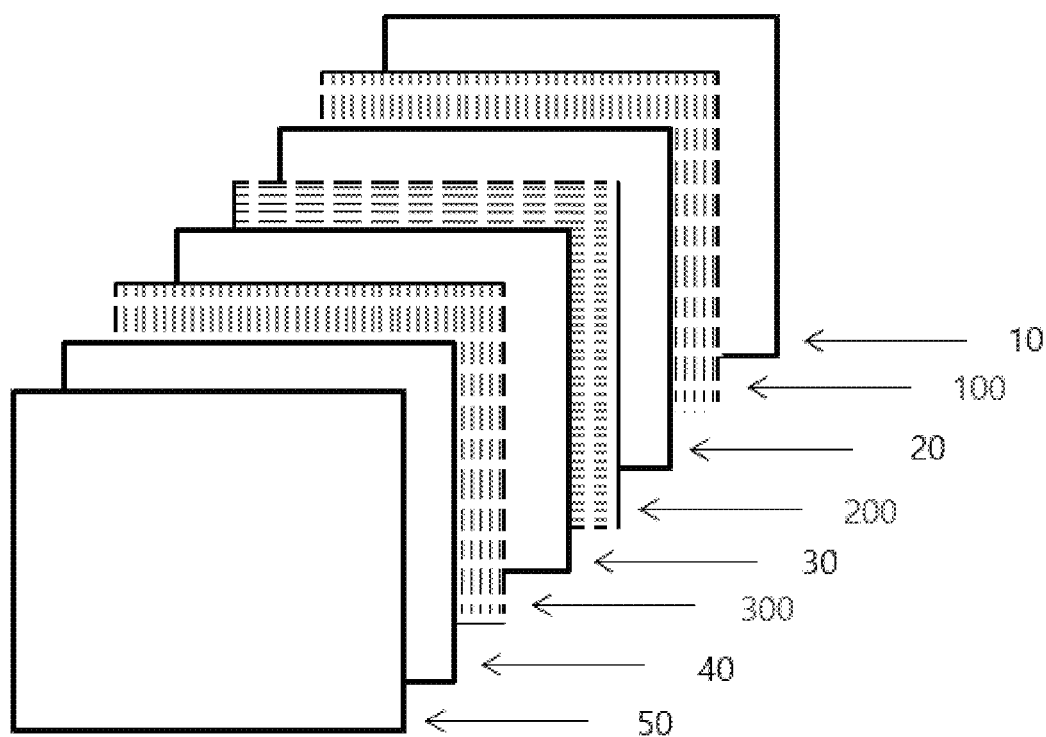
Figure 12:
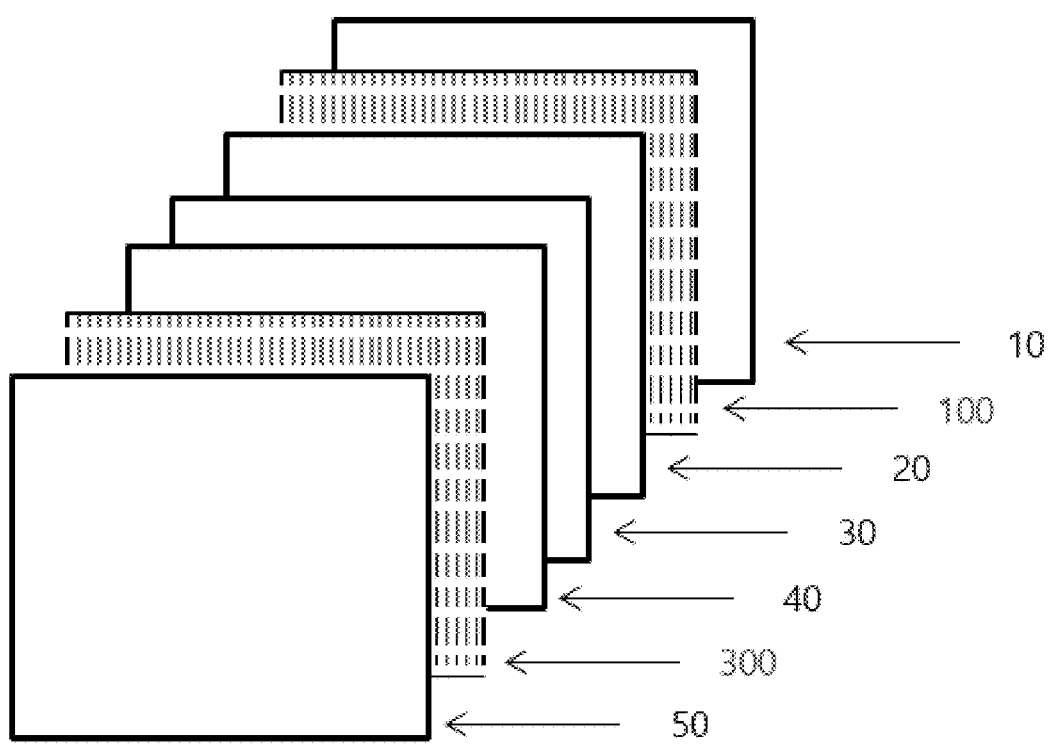
Figure 13:
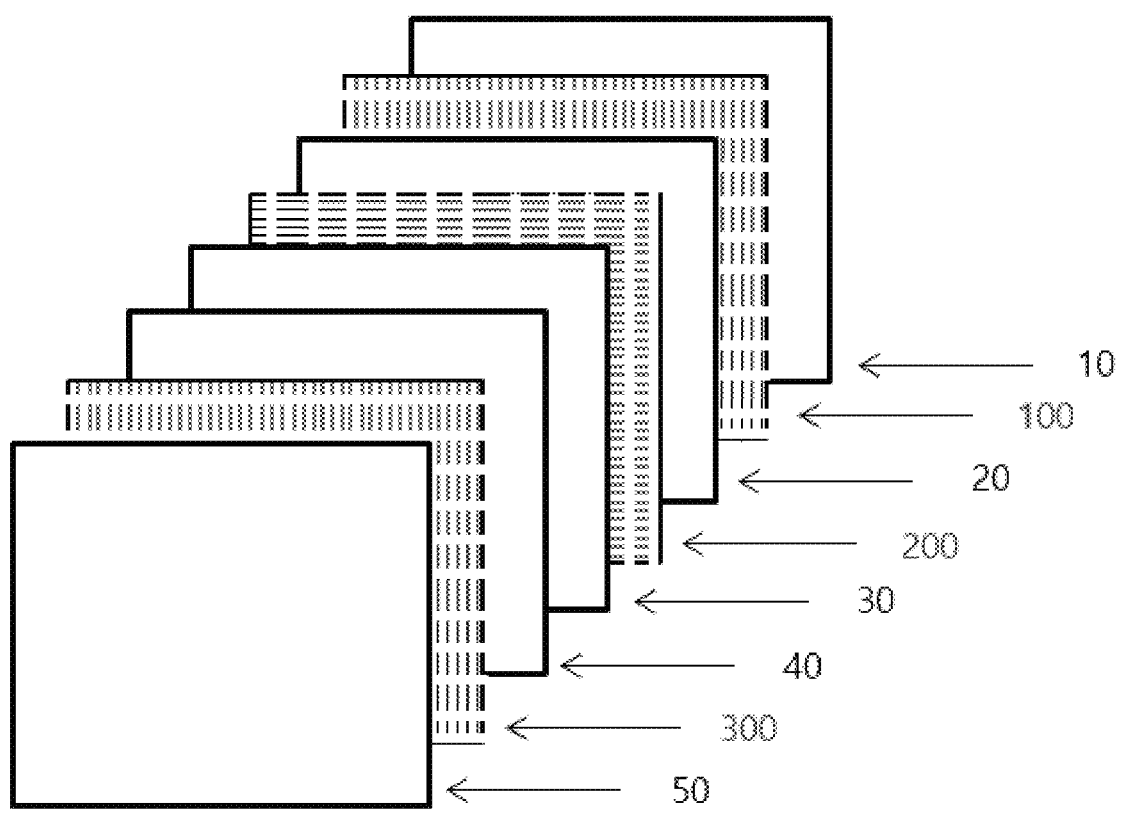
Figure 14:
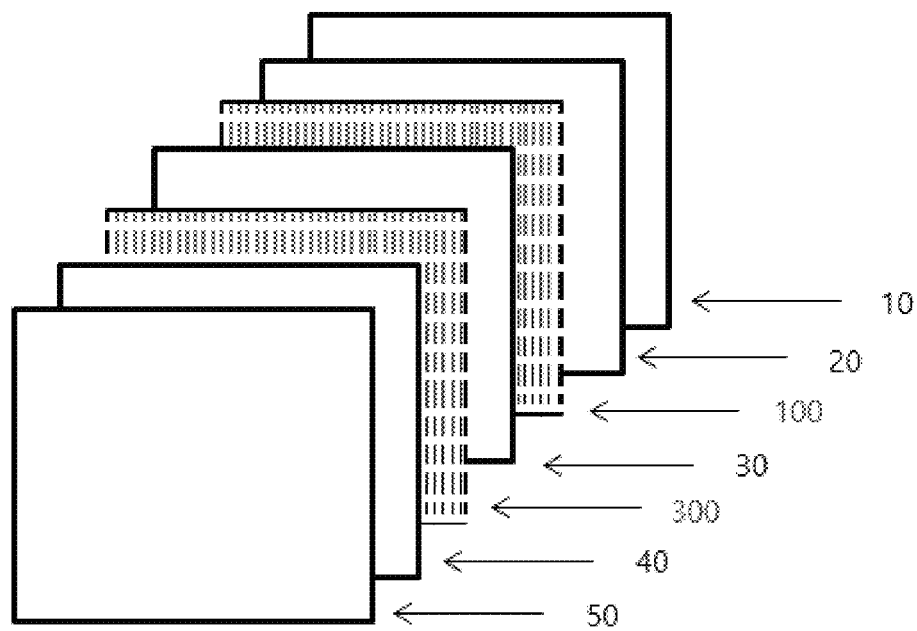
Figure 15:
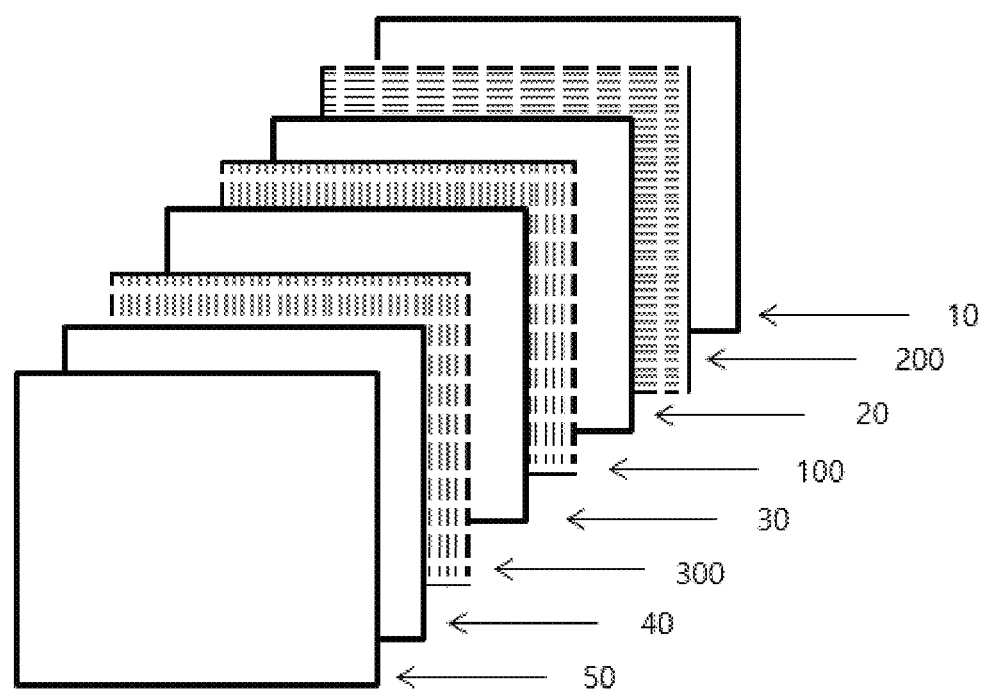
Figure 16:
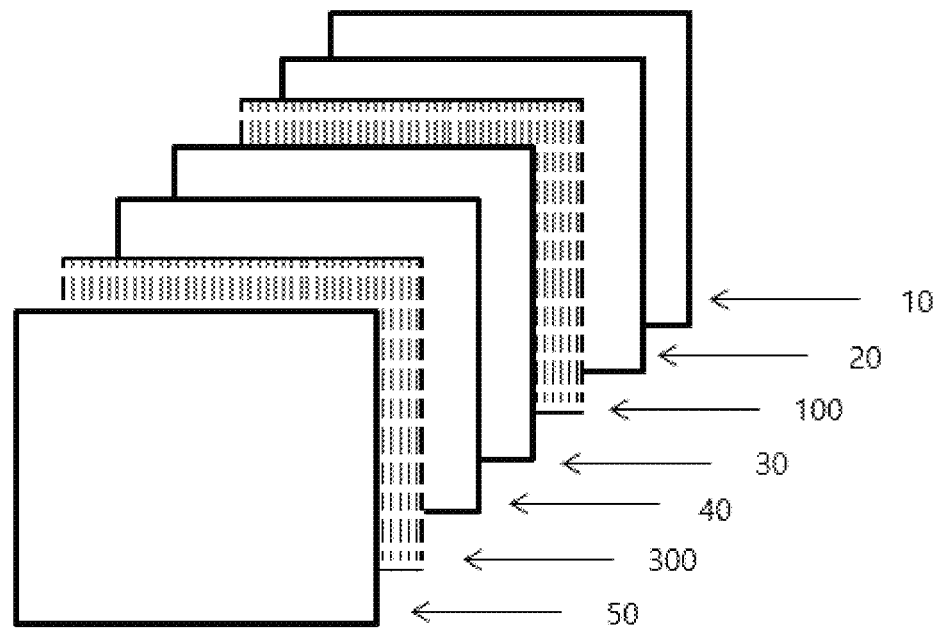
Figure 17:
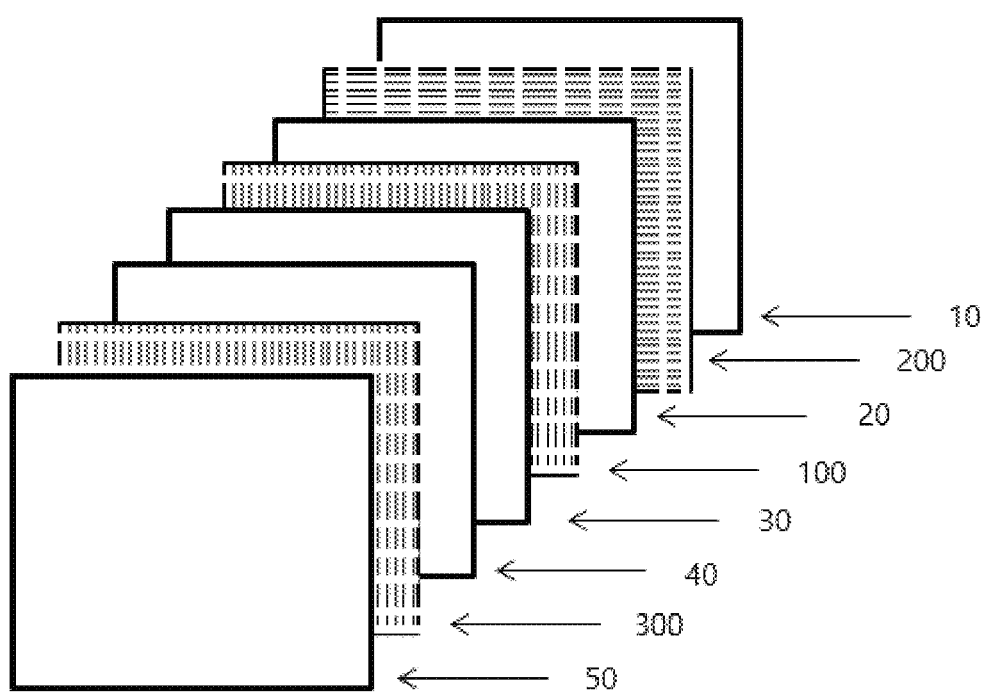
Figure 18:
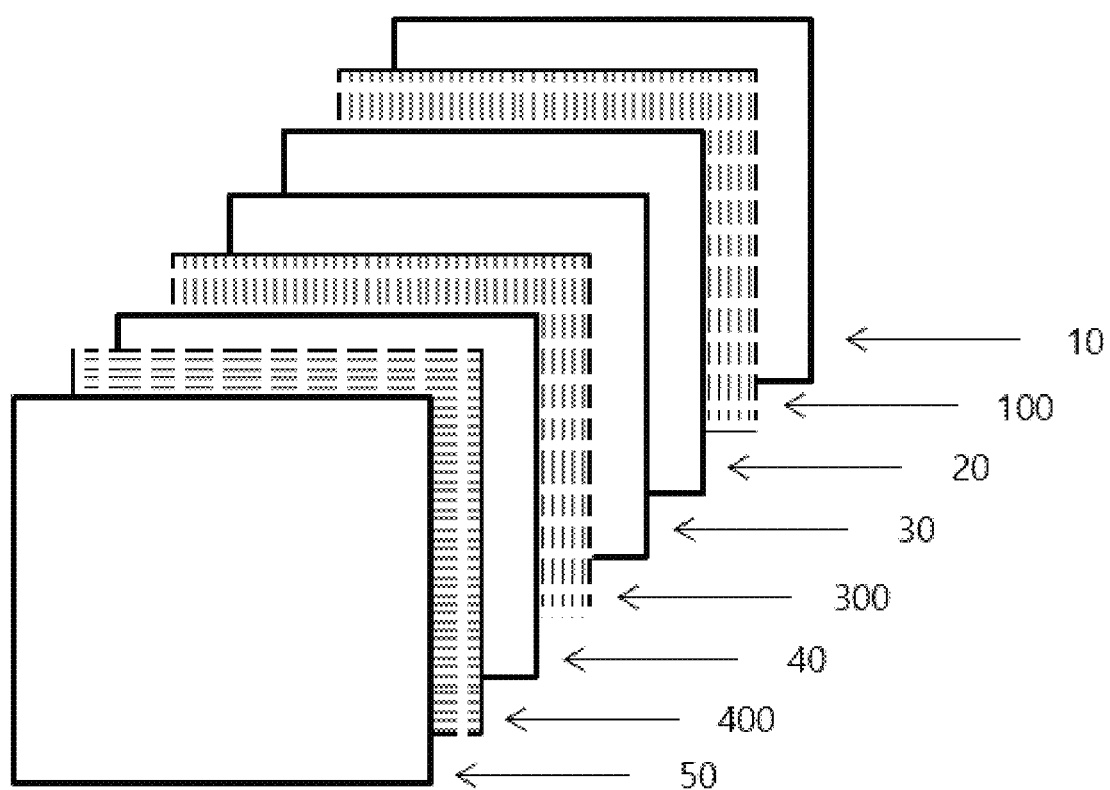
Figure 19:
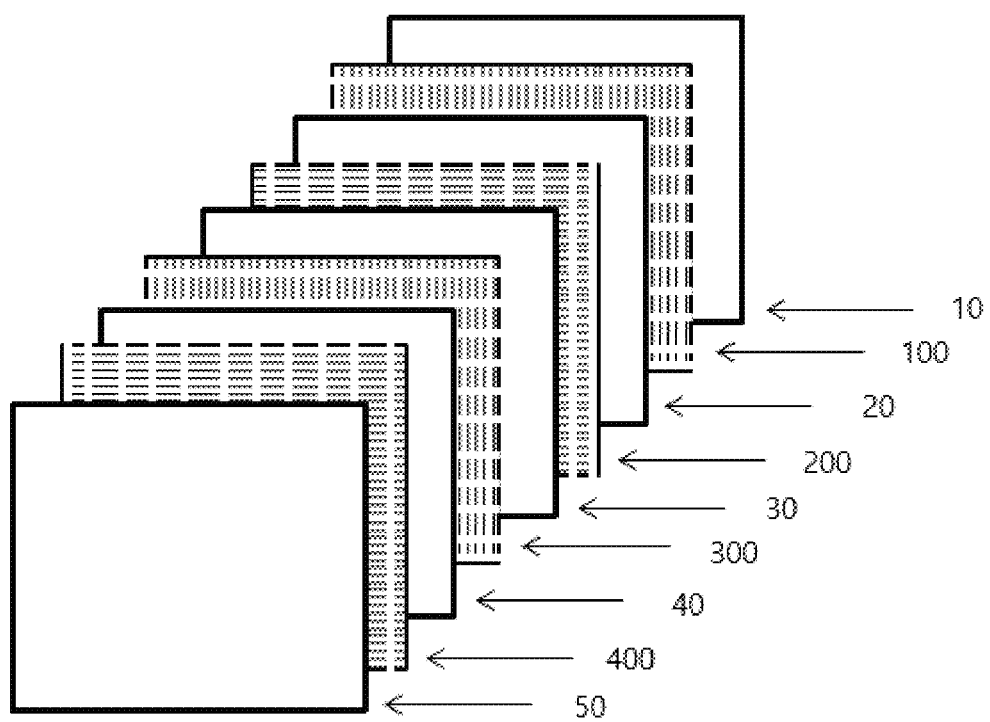
Figure 20:
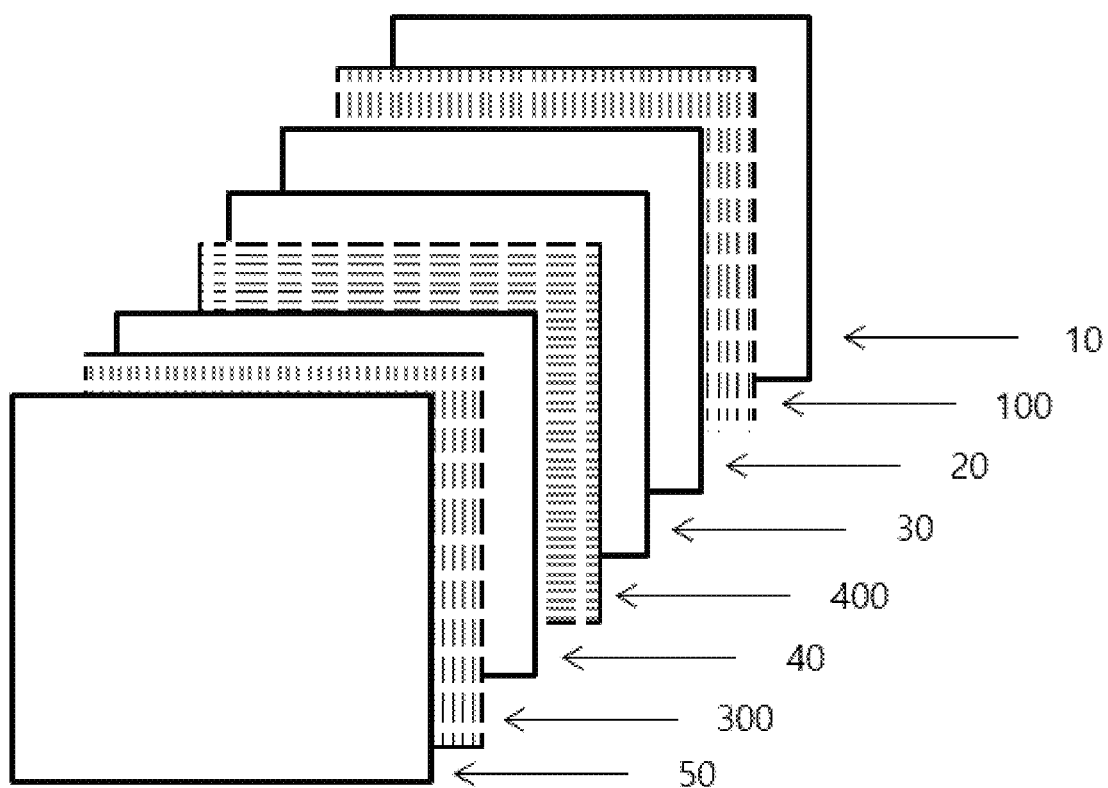
Figure 21:
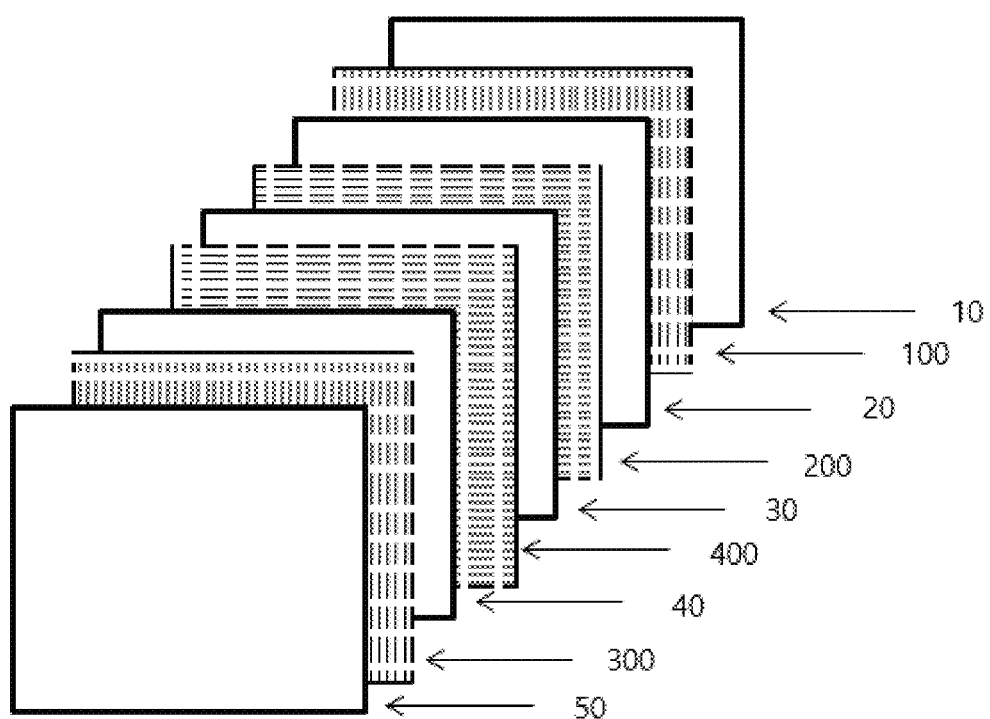
Figure 22:
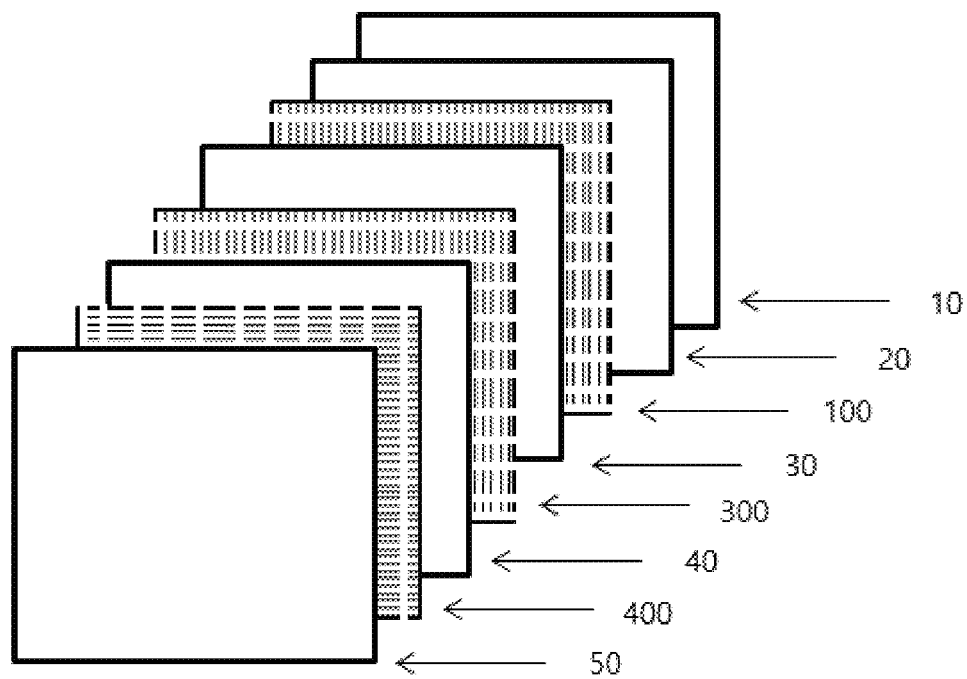
Figure 23:
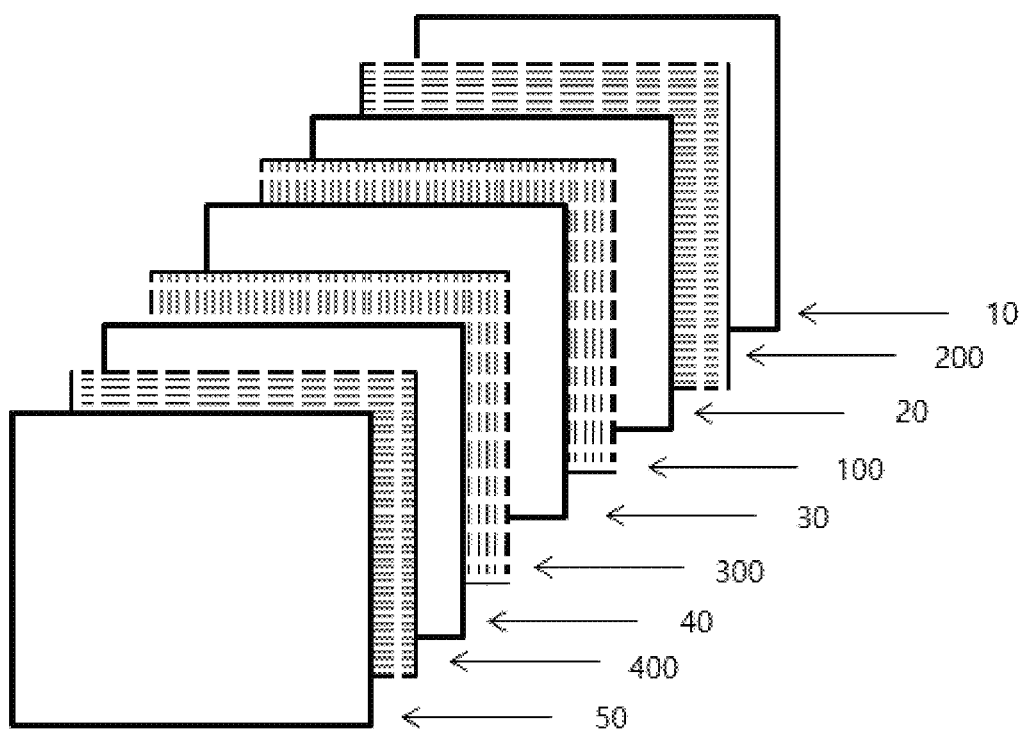
Figure 24:
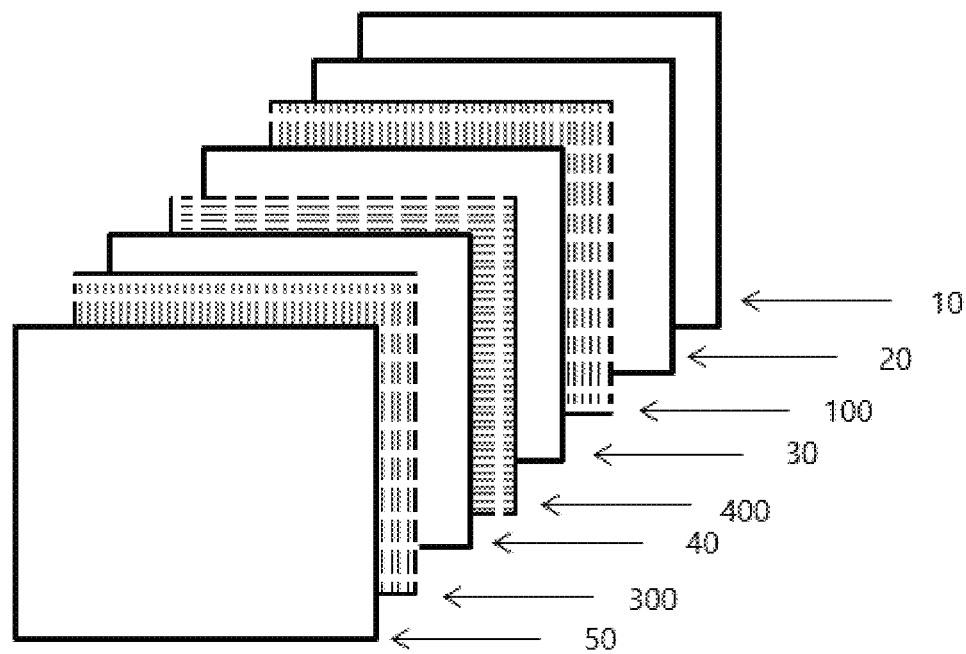
Figure 25:
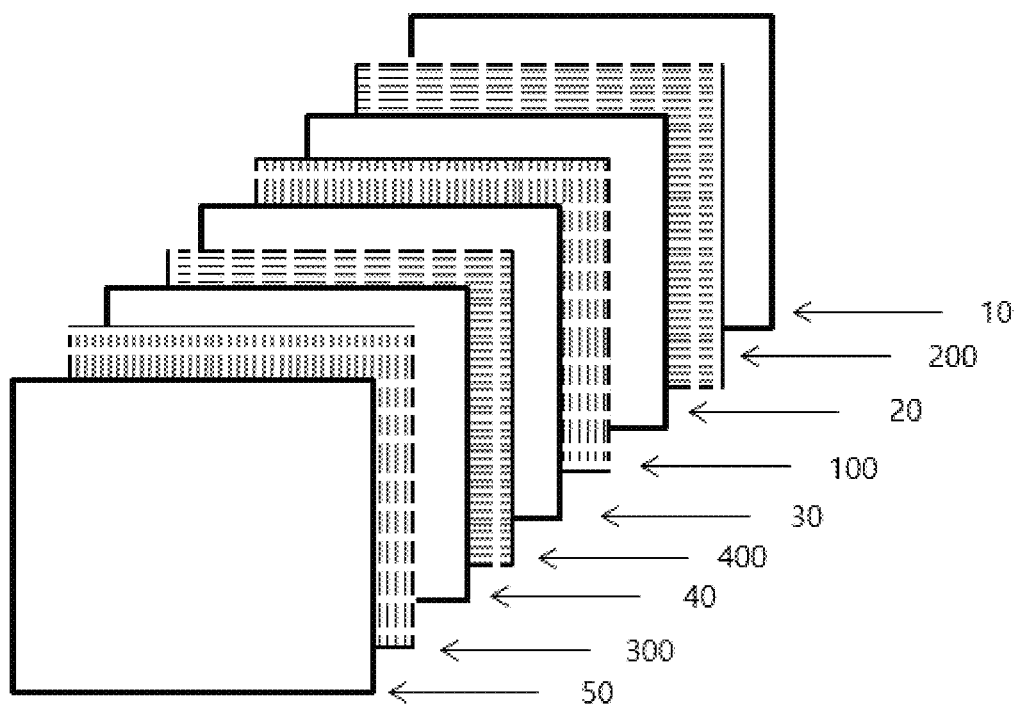
Figure 26:
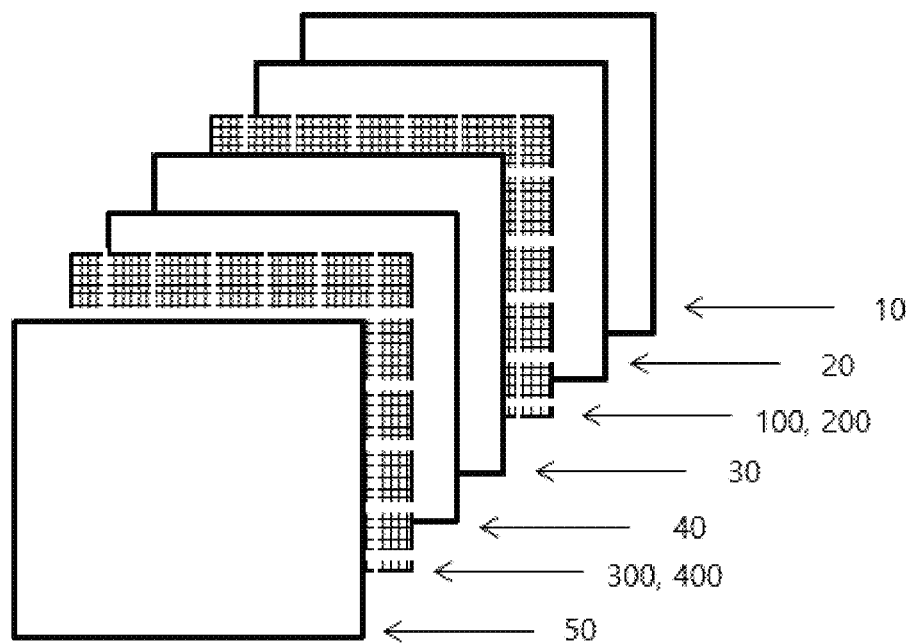
Figure 27:
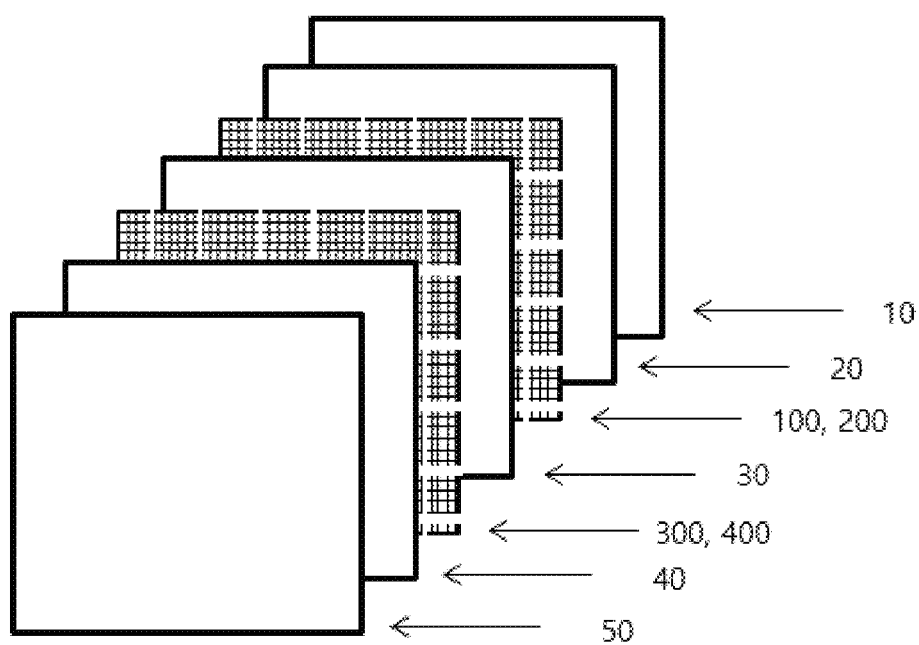
Figure 32:
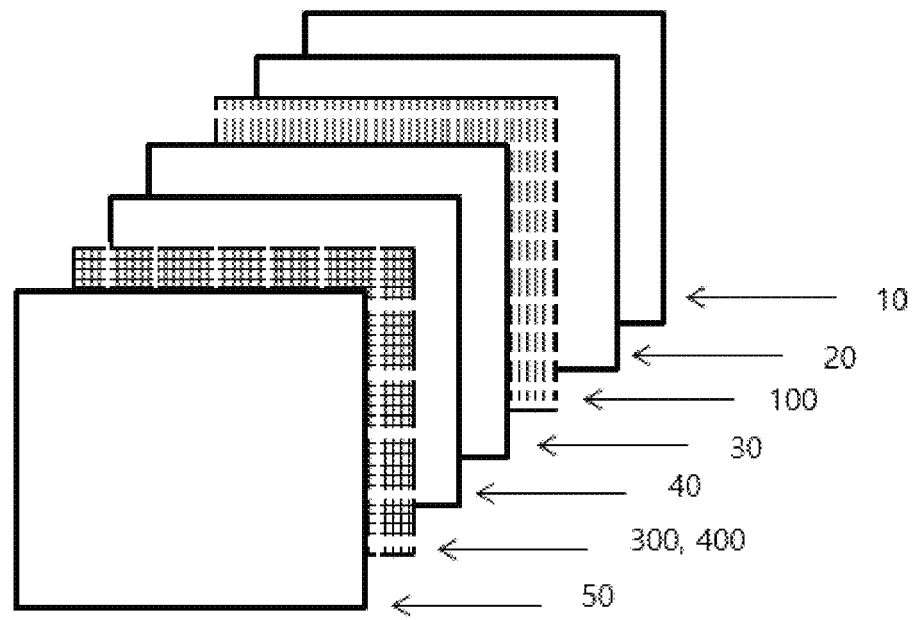
Figure 33:
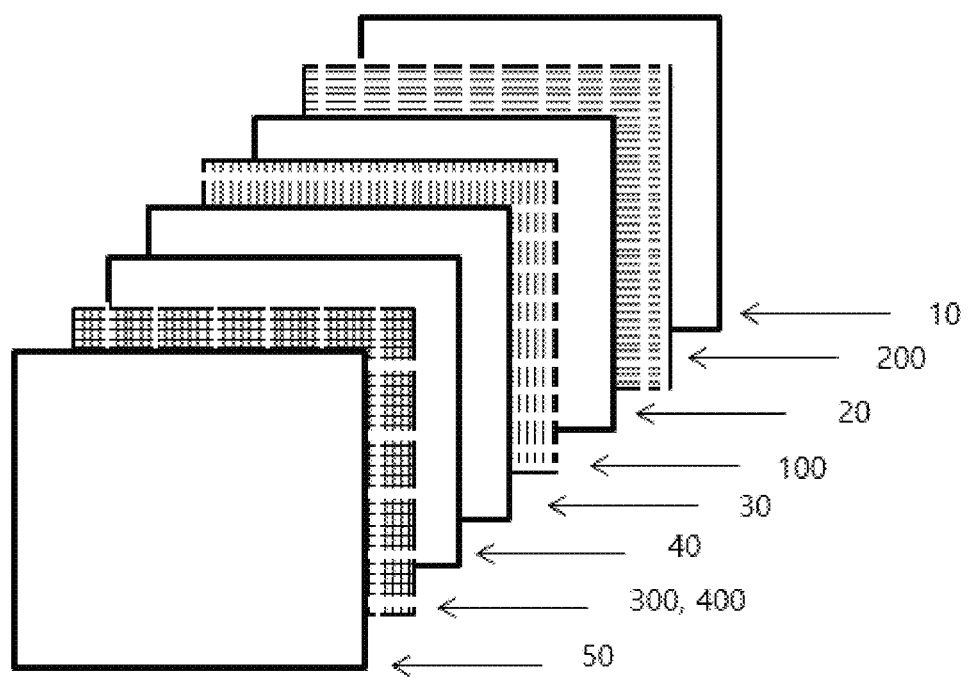
Figure 34:
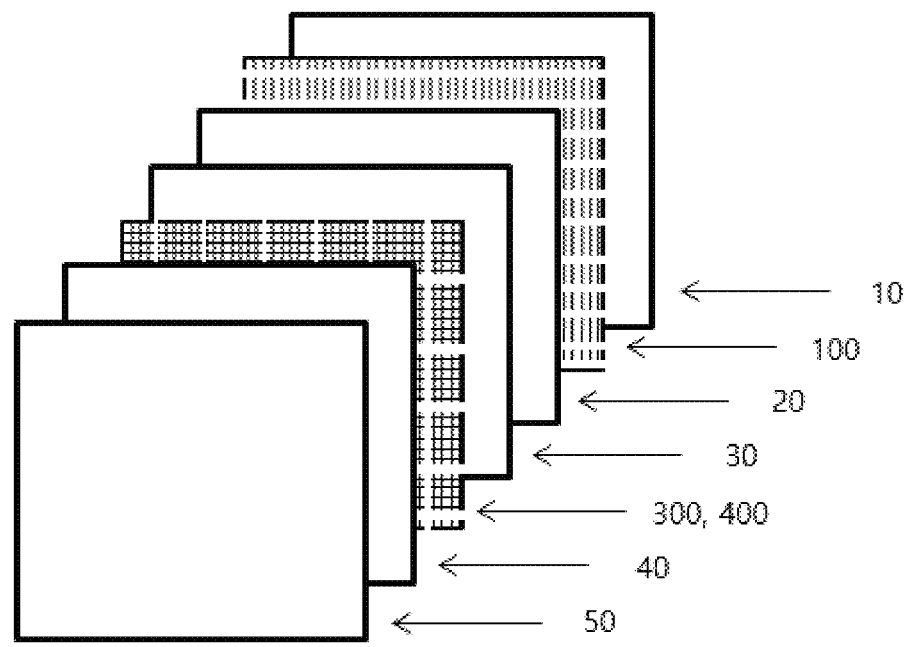
Figure 35:
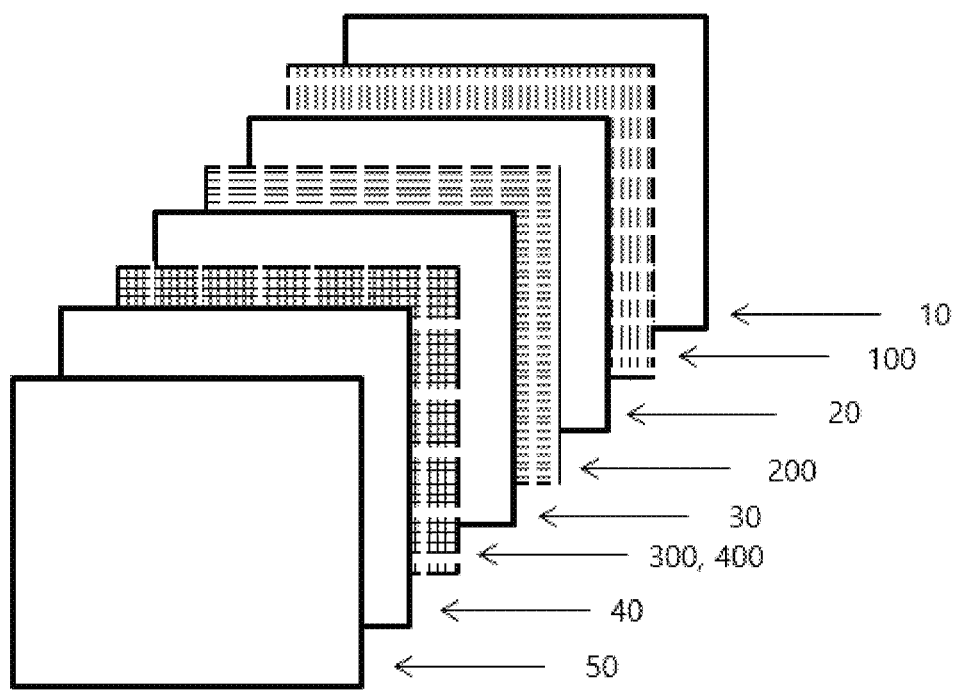
Figure 36:
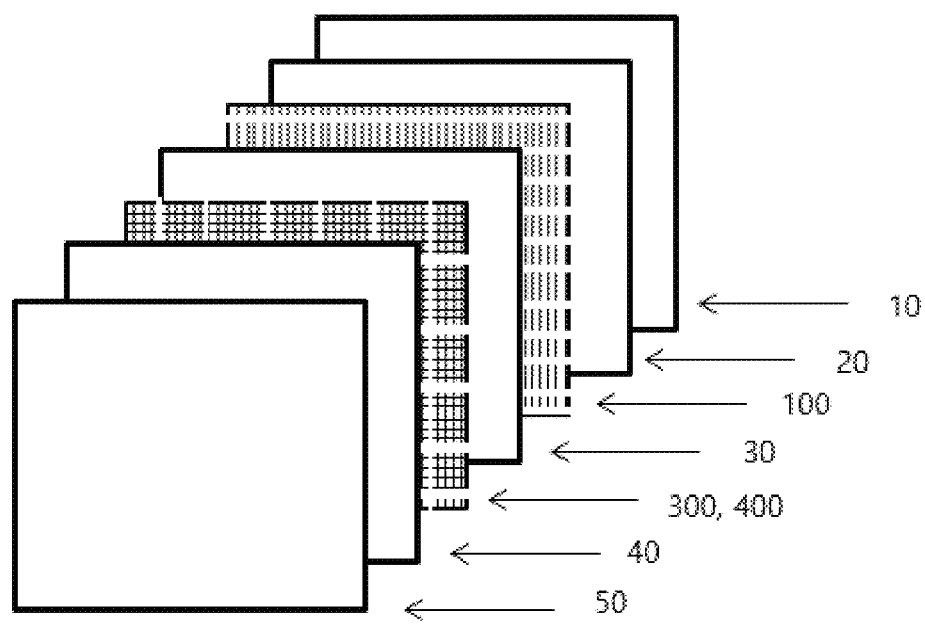
Figure 37:
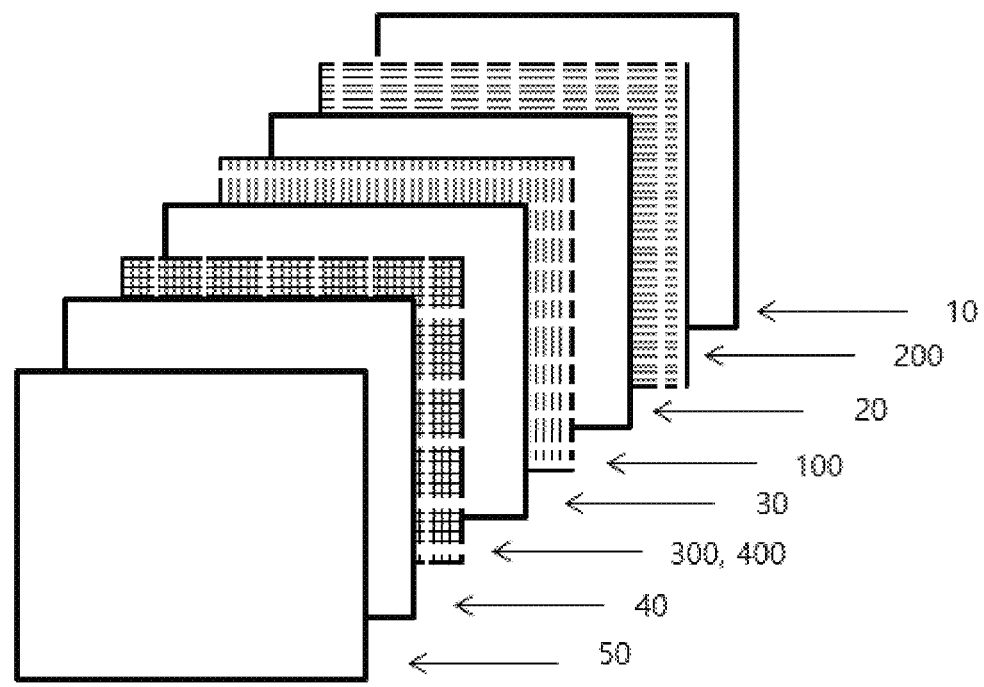

In one example, the first auxiliary electrode and the second auxiliary electrode may have at least one intersection. For example, as in FIG. 3, the device of the present application may be configured such that the first auxiliary electrode and the second auxiliary electrode have a plurality of intersections.

The electrochromic device of the present application may further comprise an ion storage layer between the electrolyte layer and the second electrode layer. The ion storage layer may mean a layer formed to match the charge balance with the electrochromic layer upon the reversible oxidation/reduction reaction for color-switching of the electrochromic material contained in the electrochromic layer.

In one example, the ion storage layer may comprise an electrochromic material having different color-switching reaction characteristics from the electrochromic material contained in the electrochromic layer. More specifically, when the electrochromic layer comprises a reductive electrochromic material, the ion storage layer may comprise an oxidative electrochromic material.

The electrochromic device of the present application may further comprise additional auxiliary electrodes positioned on different planes from the above-mentioned first auxiliary electrode and second auxiliary electrode. In one example, the auxiliary electrodes to be added may be located on one side of the ion storage layer, unlike the first and second auxiliary electrodes.

In one example, the electrochromic device may further comprise a plurality of third auxiliary electrodes arranged side by side in the first direction on one side of the ion storage layer. The plurality of third auxiliary electrodes may be spaced apart from each other in the first direction and the second direction.

In another example, the electrochromic device may further comprise a plurality of fourth auxiliary electrodes arranged side by side in the second direction on one side of the ion storage layer. The plurality of fourth auxiliary electrodes may also be spaced apart from each other in the first direction and the second direction.

In one example, the electrochromic device may comprise the third auxiliary electrode or the fourth auxiliary electrode on one side of the ion storage layer facing one side of the electrolyte layer.

In another example, the electrochromic device may comprise both the third auxiliary electrode and the fourth auxiliary electrode on one side of the ion storage layer facing one side of the electrolyte layer. In this case, the third auxiliary electrode and the fourth auxiliary electrode may have at least one intersection.

The electrochromic device of the present application may comprise auxiliary electrodes whose resistance values are different from each other. For example, as in FIG. 2, when the first auxiliary electrodes are spaced from each other in the first direction and the second direction and comprise a plurality of subordinate auxiliary electrodes arranged side by side in the first direction, the individual auxiliary electrodes may each have different resistance values from each other. Specifically, since the electrochromic device is laminated by a plurality of layers, various resistance elements exist. Particularly, even in a single electrochromic layer, there may be differences in thin film density or porosity at each point, and in addition, there are differences in distance from a power source or the electrode at each point of the electrochromic layer requiring color-switching. These factors lead to a partial color-switching speed difference even in the coplanar electrochromic layer, and as a result, the optical characteristics of the device can be made non-uniform. Accordingly, the present application can make the optical characteristics of the device uniform by controlling the resistance values to be different from each other depending on the position where each auxiliary electrode is disposed. For example, when it is determined that the color-switching degree of the center portion in the electrochromic layer is more insufficient than that of the edge portion or the color-switching speed of the center portion in the electrochromic layer is slower than that of the edge portion in consideration of each layer constitution of the device, the auxiliary electrode located on the central portion in the electrochromic layer may be configured to have a relatively lower resistance value than the auxiliary electrode located on the edge portion in the electrochromic layer. Since the resistance is a relative value to be compared between the respective auxiliary electrodes, a specific unit of the resistance value and a measuring method thereof are not particularly limited.

In one example, the individual auxiliary electrodes constituting the first auxiliary electrode may have different resistance values from each other. That is, the first auxiliary electrode may comprise subordinate first auxiliary electrodes having different resistance values from each other. This configuration can also be equally applied to the second to fourth auxiliary electrodes.

In another example, the first to fourth auxiliary electrodes may also be configured to have different resistance values from each other considering each layer constitution of the device and the optical characteristics of the device as a whole. In this case, the individual auxiliary electrodes constituting the first auxiliary electrode may have the same or different resistance values. This configuration can also be equally applied to the second to fourth auxiliary electrodes.

As described above, it is not limited only in terms of uniformity of the optical characteristics that the resistance values of the respective auxiliary electrodes are configured to be different from each other. Specifically, in the present application, the resistance values of the respective auxiliary electrodes may be configured to be different from each other so that different color-switching speeds or transmittances may be intentionally realized even on the same plane in consideration of the customer's needs, sensuousness or other purposes, and the like.

The electrochromic device of the present application may further comprise a light transmissive base material. The light transmissive base material may be provided on the outer side of the device, specifically, on the first electrode layer and the second electrode layer.

The light transmissive base material may be, for example, a base material having a visible light transmittance of about 60% to 95%. If the transmittance in the above range is satisfied, the type of the base material to be used is not particularly limited. For example, glass or a polymer resin may be used. More specifically, a polyester film such as PC (polycarbonate), PEN (poly(ethylene naphthalate)) or PET (poly(ethylene terephthalate)), an acrylic film such as PMMA (poly(methyl methacrylate)) or a polyolefin film such as PE (polyethylene) or PP (polypropylene), and the like may be used, without being limited thereto.

In one example, the electrochromic device may further comprise a power source capable of applying a voltage to the electrode. The manner of electrically connecting the power source to the device is not particularly limited, which may be suitably performed by those skilled in the art.

As shown in FIGS. 4-37, an electrochromic device may include one or more layers and auxiliary electrodes as discussed above. For example, each of the electrochromic devices may include a first electrode layer 100, an electrochromic layer 20, an electrolyte layer 30, and a second electrode layer 50. The electrochromic device also includes a plurality of first auxiliary electrodes 100 arranged side by side in the first direction and the first auxiliary electrodes 100 are spaced apart from each other in the first direction and a second direction.

In addition to the foregoing arrangement, the electrochromic device may include a plurality of second auxiliary electrodes 200, an ion storage layer 40 between the electrolyte layer 30 and the second electrode layer 50, a plurality of third auxiliary electrodes 300, and/or a plurality of fourth auxiliary electrodes 400 as discussed above.

The invention claimed is:
1. An electrochromic device comprising a first electrode layer, an electrochromic layer, an electrolyte layer, and a second electrode layer sequentially,
   wherein the electrochromic device further comprises:
      a plurality of first auxiliary electrodes arranged side by side in a first plane in a first direction, the first auxiliary electrodes being spaced apart from each other in the first direction and a second direction, and
      a plurality of second auxiliary electrodes arranged side by side in a second plane in the second direction, the second auxiliary electrodes being spaced apart from each other in the first direction and the second direction, and
   wherein the first auxiliary electrode and the second auxiliary electrode are on one side of the electrochromic layer facing the electrolyte layer.

2. The electrophoretic display device according to claim 1, comprising the first auxiliary electrode and the second auxiliary electrode on one side of the electrochromic layer facing one side of the electrolyte layer, wherein the first auxiliary electrode and the second auxiliary electrode have at least one intersection.

3. The electrochromic device according to claim 1, wherein the electrochromic device further comprises an ion storage layer between the electrolyte layer and the second electrode layer.

4. The electrochromic device according to claim 3, further comprising a plurality of third auxiliary electrodes arranged side by side in the first direction on one side of the ion storage layer, wherein the third auxiliary electrodes are spaced apart from each other in the first direction and the second direction.

5. The electrochromic device according to claim 4, further comprising a plurality of fourth auxiliary electrodes arranged side by side in the second direction on one side of the ion storage layer, wherein the fourth auxiliary electrodes are spaced apart from each other in the first direction and the second direction.

6. The electrochromic device according to claim 5, comprising the third auxiliary electrode and the fourth auxiliary electrode on one side of the ion storage layer facing one side of the electrolyte layer, wherein the third auxiliary electrode and the fourth auxiliary electrode have at least one intersection.

7. The electrochromic device according to claim 6, wherein the first to fourth auxiliary electrodes comprise conductive lines and insulating parts surrounding the conductive lines.

8. The electrochromic device according to claim 7, wherein the conductive line comprises a metal selected from silver (Ag), copper (Cu), aluminum (Al), magnesium (Mg), gold (Au), platinum (Pt), tungsten (W), molybdenum (Mo), titanium (Ti), nickel (Ni), and an alloy thereof; graphene; or carbon nanotubes.

9. The electrochromic device according to claim 7, wherein the insulating part comprises an insulating material having an electric conductivity of $10^{-6}$ S/m or less.

10. The electrochromic device according to claim 9, wherein the insulating material comprises a (meth)acrylate resin or an epoxy resin.

11. The electrochromic device according to claim 1, wherein the first electrode layer and the second electrode layer comprise a transparent conductive compound, a metal mesh, or an OMO (oxide/metal/oxide).

12. The electrochromic device according to claim 3, wherein the ion storage layer and the electrochromic layer comprise electrochromic materials having different color-development characteristics from each other.

13. An electrochromic device comprising a first electrode layer, an electrochromic layer, an electrolyte layer, and a second electrode layer sequentially,
wherein the electrochromic device further comprises:
a plurality of first auxiliary electrodes arranged side by side in a first plane in a first direction, the first auxiliary electrodes being spaced apart from each other in the first direction and a second direction, and
a plurality of second auxiliary electrodes arranged side by side in a second plane in the second direction, the second auxiliary electrodes being spaced apart from each other in the first direction and the second direction, and
wherein the first auxiliary electrode or the second auxiliary electrode is directly on one side of the electrochromic layer facing the electrolyte layer.

\* \* \* \* \*